US012766722B2

(12) United States Patent
Longo et al.

(10) Patent No.: US 12,766,722 B2
(45) Date of Patent: Oct. 20, 2026

(54) METHOD FOR INSPECTING AND/OR HANDLING A COMPONENT VIA A ROBOTIC ARM, AND CORRESPONDING SYSTEM AND COMPUTER-PROGRAM PRODUCT

(71) Applicant: Comau S.p.A., Grugliasco (IT)

(72) Inventors: Nicola Longo, Grugliasco (IT); Giovanni Di Stefano, Grugliasco (IT); Simone Panicucci, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 38 days.

(21) Appl. No.: 18/839,958

(22) PCT Filed: Feb. 22, 2023

(86) PCT No.: PCT/IB2023/051592
§ 371 (c)(1),
(2) Date: Aug. 20, 2024

(87) PCT Pub. No.: WO2023/161801
PCT Pub. Date: Aug. 31, 2023

(65) Prior Publication Data

US 2025/0178199 A1 Jun. 5, 2025

(30) Foreign Application Priority Data

Feb. 23, 2022 (IT) ........................ 102022000003365

(51) Int. Cl.
*B25J 9/16* (2006.01)

(52) U.S. Cl.
CPC ........... *B25J 9/1671* (2013.01); *B25J 9/1676* (2013.01); *B25J 9/1697* (2013.01)

(58) Field of Classification Search
None
See application file for complete search history.

(56) References Cited

U.S. PATENT DOCUMENTS 5,737,500 A 4/1998 Seraji et al.
6,400,998 B1 6/2002 Yamazaki et al.
(Continued)

FOREIGN PATENT DOCUMENTS

CN 113380110 A * 9/2021 ......... G09B 19/0053
JP 2010094777 A * 4/2010
(Continued)

OTHER PUBLICATIONS

Natonek E et al: "Model Based Vision as Feedback for Virtual Reality Robotics Environments", Proceedings of the Virtual Reality Annual International Symposium. Research Triangle Park, Mar. 11-15, 1995; [Proceedings of the Virtual Reality Annual International Symposium], Los Alamitos, IEEE coup. soc. Press, US, Mar. 11, 1995 (Mar. 11, 1995), pp. 110-117.
(Continued)

*Primary Examiner* — Khoi H Tran
*Assistant Examiner* — Dairon Estevez

(57) ABSTRACT

A method and product for inspecting and/or handling a component via a robotic arm includes a computer for displaying a first 3-D model of a component in a virtual environment. Sensors are used to generate a second 3-D model of the component which is compared to the first 3-D model to determine the position of the component relative to the robot arm. A graphic interface is used to generate a high level sequence of commands (CPRG) for moving the robot arm and executing predetermined actions on the component. Intended movements of the robot arm and actions in the commands are simulated and evaluated in the virtual environment. Acceptable robot arm movements proven in the virtual environment are converted to movement instructions (RPRG) and sent to a controller to execute movement of the robot, and actions of the sensors and/or actuators to inspect and/or handle the component.

15 Claims, 11 Drawing Sheets

(56) References Cited

U.S. PATENT DOCUMENTS

| | | | | |
|---|---|---|---|---|
| 8,307,061 | B1 | 11/2012 | Hickman et al. | |
| 8,412,379 | B2 | 4/2013 | Gerio et al. | |
| 8,700,307 | B1 * | 4/2014 | Zhao | B25J 9/1666 701/301 |
| 9,517,502 | B2 | 12/2016 | Di Stefano et al. | |
| 2008/0125893 | A1 | 5/2008 | Tilove et al. | |
| 2013/0041504 | A1 | 2/2013 | Kubota et al. | |
| 2016/0195390 | A1 * | 7/2016 | Nissen | B25J 11/00 901/44 |
| 2017/0202537 | A1 | 7/2017 | Ippolito et al. | |
| 2017/0266810 | A1 * | 9/2017 | Linnell | B25J 9/1664 |
| 2018/0178388 | A1 * | 6/2018 | Ishige | B25J 9/1692 |
| 2019/0217477 | A1 * | 7/2019 | Paepcke | B25J 9/1697 |
| 2019/0291277 | A1 * | 9/2019 | Oleynik | B25J 9/1669 |
| 2023/0109876 | A1 * | 4/2023 | Kogushi | B25J 9/1664 700/245 |
| 2023/0113312 | A1 * | 4/2023 | Junio | A61B 34/20 700/255 |
| 2023/0182292 | A1 * | 6/2023 | Namiki | B25J 9/1656 700/245 |
| 2024/0116192 | A1 * | 4/2024 | Bicchi | B25J 13/087 |

FOREIGN PATENT DOCUMENTS

| | | | | | |
|---|---|---|---|---|---|
| JP | 2018153910 | A | * | 10/2018 | |
| WO | WO-2017133781 | A1 | * | 8/2017 | B25J 9/1656 |

OTHER PUBLICATIONS

Tolga Birdal and Slobodan Ilic, "A point sampling algorithm for 3D matching of irregular geometries", IEEE/RSJ International Conference on Intelligent Robots and Systems (IROS), IEEE, 2017.

U.S. Appl. No. 18/574,382, filed Dec. 27, 2023 entitled: A Processing Apparatus And Relative Marking Device To Generate Process Trajectories.

U.S. Appl. No. 18/723,582, filed Jun. 24, 2024 entitled: An Apparatus And Method For Automatically Testing An Infotainment System Of A Motor-Vehicle.

* cited by examiner

FIG. 9

CMD1

CMD9

| SID | CON | AT | ARG1 | ARG2 |
|---|---|---|---|---|
| 1 | None | Reproduce | *Voice* | *«Call Mark»* |
| 2 | 1 OK | Listen | *Sound* | */sounds/callOK.mp3* |
| 3 | 2 OK | Wait | *Seconds* | *5* |
| 4 | 3 OK | Move | *POI* | *CPOI1* |
| 5 | 4 OK | Look | *Image* | */icons/close.jpg* |
| 6 | 5 OK | Move | *Touch* | *5* |
| 7 | 6 OK | Look | *Text* | *«Call Terminated»* |
| 8 | 7 NOK | Go To | *4* | |
| 9 | None | ... | ... | ... |
| ... | ... | ... | ... | ... |

FIG. 10

CMD1

⋮

CMD8

| SID | CON | AT | ARG1 | ARG2 |
| --- | --- | --- | --- | --- |
| 1 | None | Move | *POI* | *CPOI1* |
| 2 | 1 OK | Look | *Get* | *"cpoi1.jpg"* |
| 3 | 2 OK | Tap | *Sound* | *"cpoi1.mp3"* |
| 4 | 3 OK | Ultrasound | *Thickness* | *200* |
| 5 | 4 OK | Move | *POI* | *CPOI2* |
| 6 | 5 OK | Look | *Get* | *"cpoi2.jpg"* |
| 7 | 6 OK | Tap | *Sound* | *"cpoi1.mp3"* |
| 8 | 7 OK | Ultrasound | *Thickness* | *200* |
| 9 | ... | ... | ... | ... |
| ... | ... | ... | ... | ... |

METHOD FOR INSPECTING AND/OR HANDLING A COMPONENT VIA A ROBOTIC ARM, AND CORRESPONDING SYSTEM AND COMPUTER-PROGRAM PRODUCT

CROSS-REFERENCE TO RELATED APPLICATION(S)

This application is filed pursuant to 35 U.S.C. § 371 claiming priority benefit to PCT/IB2023/0051592 filed Feb. 22, 2023, which claims priority benefit to Italian Patent Application No. 102022000003365 filed Feb. 23, 2022, the contents of both applications are incorporated herein by reference in their entirety for all purposes.

TECHNICAL FIELD

Various embodiments of the present disclosure regard solutions for controlling operation of a robotic arm.

BACKGROUND

FIG. 1 shows an example of a control system of a robotic arm 10, typically comprising a sequence of rigid segments, or links, connected by rotation joints or translation joints actuated by a respective motor.

In particular, in the example considered, the system should carry out one or more machining operations and/or inspection operations of a component 20. For this purpose, a given tool and/or sensor is mounted on the robotic arm 10, typically on the last link of the robotic arm 10, and the tool and/or sensor, typically identified via the so-called tool centre point (TCP), should be positioned in given positions.

Consequently, in order to control the movement of the robotic arm 10, the system comprises a robotic-arm controller 30 configured to drive the motors of the robotic arm 10 in such a way as to actuate the joints of the robotic arm 10 and position the links of the robotic arm 10 and consequently the TCP. For this purpose, the controller 30, for example implemented via a programmable logic controller (PLC) or some other processing circuit, typically executes actuation instructions that control driving of the motors of the robotic arm 10, typically the profile of acceleration, velocity and position, also as a function of one or more feedback signals indicative of the position and/or of the movement of the robotic arm 10, such as signals supplied by the encoders associated to the joints, and/or gyroscopes and/or accelerometers mounted on one or more of the links, etc.

Frequently, modern controllers 30 are also able to receive directly control commands at a higher level, for example a command comprising a required position and typically also a required orientation for the TCP, or directly a trajectory to be followed. In fact, using a kinematic model of the robotic arm 10, the controller 30 is able to generate a sequence of actuation instructions to reach the required position and the required orientation. For instance, for this purpose documents U.S. Pat. Nos. 5,737,500 A and 6,400,998 B1 can be cited, the contents of which are incorporated herein for reference.

In this context, modern robotic arms 10 frequently have a kinematic redundancy; i.e., the size of the operating space is smaller than the size of the space of the joints. In fact, this makes it possible to reach a given position and a given orientation with multiple, and practically infinite, solutions that are optimizable. However, this also implies an additional complexity of calculation and control. For instance, in this case, it is not easy to foresee the movement of all the links of the robotic arm 10 in response to a control program comprising a sequence of actuation instructions and/or control commands sent to the controller 30. For instance, the most common programming languages for movement of a robotic arm are PDL2 (Comau), RAPID (ABB), KRL (Kuka), or AS (INFORM and Kawasaki).

Consequently, to check the behaviour of the robotic arm 10 in response to a control program sent to the controller 30, there have been proposed solutions that enable simulation of the movement of the robotic arm 30. For instance, for this purpose a computing device 40, such as a computer, is typically used, which makes it possible to display a simulation of the movement of the robotic arm 10 in a virtual environment 42. For instance, for this purpose document US 2008/0125893 A1 may be cited, the contents of which are incorporated herein for reference.

For instance, FIG. 2 shows a typical operation of a program run on the computer 40.

In particular, after a start step 1000, the computer 40 receives, in a step 1002, a model RM of the robotic arm 10 and a model CM of the component 20. For instance, the model RM may comprise a three-dimensional (3D) model of the robotic arm 10 and the respective kinematic model. Likewise, the model CM may comprise a 3D model of the component 20 and possibly further characteristics of the component 20, for example properties of the material of the component 20 that may be important for possible machining operations to be carried out, for example with reference to deformability. For instance, the 3D models may be generated with traditional CAD (Computer-Aided Design) programs. Consequently, the model of the robotic arm RM and the model of the component CM can be loaded, with their corresponding positions, into the virtual environment 42; i.e., the models RM and CM are positioned in the virtual environment 42 on the basis of the relative position between the robotic arm 10 and the component 20 in the real environment. In general, the virtual environment 42 may also comprise further elements, for example with reference to possible obstacles in the environment in which the robotic arm 10 is positioned, such as walls and/or fences that limit the movement of the robotic arm 10.

In a step 1006, an operator can then generate a control program RPRG, which comprises a sequence of actuation instructions and/or control commands. In general, the simulation program itself or a further development environment may be used for this purpose. Consequently, in a step 1008, the computer 40 receives the control program RPRG and simulates the movement of the robotic arm 10 in the virtual environment 42 using for this purpose the models RM and CM.

Consequently, in a step 1010, the operator or directly the computer 40 can check whether the control program RPRG is correct. For instance, for this purpose, the computer 40 can check whether the movement of the model of the robotic arm RM entails collision with objects in the virtual environment 42, for example the component CM, a wall, etc.

In the case where the control program RPRG is correct (output "Y" from the verification step 1010), the operator or directly the computer 40 can then send, in a step 1012, the control program RPRG to the controller 30 and the method terminates, in an end step 1014. Otherwise (output "N" from the verification step 1010), the operator can modify, in step 1006, the control program RPRG and repeat the simulation, in step 1100.

Consequently, in the example considered, the steps 1002-1010 implement an offline programming method 1100, i.e., without a real interaction with the robotic arm 10, whilst only step 1012 implements an online control procedure 1200, which results in execution of the control program RPRG by the controller 30 and corresponding movement of the robotic arm 10.

Consequently, programming via a virtual environment 42 makes it possible to reduce the risk of problems arising during actual movement of the robotic arm 10. However, such programming is performed using complex programming languages and thus requires qualified operators.

SUMMARY

The objects of various embodiments of the present disclosure are thus new solutions that facilitate programming of the operations performed by a robotic arm.

According to one or more embodiments, one or more of the above objects are achieved through a method having the distinctive elements set forth specifically in the ensuing claims. The embodiments moreover regard a corresponding system, as well as a corresponding computer-program product, which can be loaded into the memory of at least one computer and comprises portions of software code for implementing the steps of the method when the product is run on a computer. As used herein, reference to such a computer-program product intended to be equivalent to reference to a computer-readable means containing instructions for controlling a processing system in order to coordinate execution of the method. Reference to "at least one computer" evidently intended to highlight the possibility of the present disclosure being implemented in a distributed/modular way.

The claims form an integral part of the technical teaching of the description provided herein.

As mentioned previously, various embodiments of the present description regard solutions for inspecting and/or handling a component or object via a robotic arm, wherein movement of the robotic arm is managed via a controller as a function of movement instructions. For instance, movement instructions can specify one or more points of a trajectory in the reference system of the robotic arm. In various embodiments, one or more sensors are mounted on the robotic arm and/or are installed on a platform on which the robotic arm is mounted and/or are installed in the environment in which the robotic arm is positioned. The controller and the one or more sensors are connected to a computer.

In particular, in various embodiments, the computer receives a three-dimensional model of the component and shows the three-dimensional model of the component in a virtual environment having a given reference system. As will be described in greater detail hereinafter, in various embodiments the three-dimensional model of the component can be generated and/or updated by acquiring, via the sensors, one or more images and/or a point cloud of the component. In various embodiments, the virtual environment makes it possible to specify one or more points of interest. Consequently, the computer receives one or more points of interest in the reference system of the virtual environment. In various embodiments, the computer can also automatically generate one or more of the points of interest, for example as a function of a given area or surface of the component selected by the operator.

Next, the computer shows a graphic interface that makes it possible to specify a sequence of commands comprising a plurality of commands for interacting with the robotic arm and/or the one or more sensors, where each command comprises data that identify an action and one or more parameters for the action. In various embodiments, the sequence of commands comprises data that specify, for each command, a respective condition that indicates when the respective action should be executed. For instance, the graphic interface may comprise a graphic interface for specifying a list of commands and/or a graphic interface for specifying the sequence of commands via a flowchart. In particular, in various embodiments, a first command requests movement of the robotic arm into a given point of interest of the one or more points of interest. For instance, the sequence of commands may be saved in the form of a list, for example by means of an Excel, CSV, XML file. In various embodiments, the computer can also automatically generate one or more of the commands, for example as a function of a given type of inspection to be carried out for all the points of interest or a sub-set of the points of interest.

In various embodiments, the computer then acquires, via the one or more sensors, one or more images and/or a point cloud of the component, and compares the images and/or the point cloud with the three-dimensional model of the component to determine the position of the component with respect to the robotic arm. Next, the computer can convert the coordinates of the given point of interest in the reference system of the virtual environment into coordinates in the reference system of the robotic arm, using for this purpose the position of the component with respect to the robotic arm. In various embodiments, the computer can also update the three-dimensional model of the component as a function of the images and/or of the point cloud. In particular, in various embodiments, the computer can carry out a first scan of the component and possibly of the environment to generate the model of the component and/or to update the model of the component. Next, the operator can specify the points of interest and the commands using the above model of the component. Consequently, in this, case the computer can carry out a second scan of the component to align the model (with the respective points of interest) with the (real) position of the component.

In various embodiments, the computer then generates a second virtual environment using the three-dimensional model of the component and a model of the robotic arm. In general, this virtual environment may correspond to the virtual environment used for defining (manually or automatically) the points of interest, or else a dedicated virtual environment may be used.

In various embodiments, the computer can also acquire, via the one or more sensors, one or more images and/or a point cloud of one or more (further) obstacles in the environment in which the robotic arm is positioned. Consequently, the computer can also generate a three-dimensional model of the one or more obstacles as a function of the one or more images and/or of the point cloud and position the three-dimensional model of the one or more obstacles in the second virtual environment.

In various embodiments, the computer then repeats a sequence of operations for each command. In particular, initially the computer checks whether the command requests a movement of the robotic arm, for example because the command corresponds to the first command that requests movement of the robotic arm into the given point of interest. Other movement commands may request movement into a point determined as a function of a previous command, a predetermined movement, and/or opening of a file that comprises a sequence of one or more movement instructions and sending of the one or more movement instructions to the controller. One or more commands may also request acquisition of data, via the one or more sensors, and/or driving of one or more actuators mounted on the robotic arm and configured for handling the component. For instance, the commands may request at least one of the following: acquisition of an audio recording and storage of the audio recording in a file; acquisition of an audio recording, generation of a text via a speech recognition of the audio recording, and comparison of the recognized text with reference text; acquisition of an image and storage of the image in a file; and acquisition of an image, generation of a text via a character-recognition operation on the image, and a comparison of the recognized text with reference text. Additionally or alternatively, the commands may request driving of one or more of the actuators, and/or simultaneously driving of one or more of the actuators and acquisition of data via the one or more sensors.

In the case where the command corresponds to the first command (or likewise another command to reach a given position), the computer automatically selects a trajectory for moving the robotic arm in the coordinates of the given point of interest in the reference system of the robotic arm and evaluates the selected trajectory in the second virtual environment to determine whether the robotic arm can follow the selected trajectory without colliding with the three-dimensional model of the component and possibly the three-dimensional model of the one or more (further) obstacles. For instance, for this purpose the computer can define an optimization problem by adding as constraints all the obstacles present in the second virtual environment and constraints due to the process (for example, the position and possibly the orientation of the point of interest to be reached, the distance from the surface of the component, etc.) and optionally find an optimized trajectory according to a given cost function, such as the distance covered, the inertia on the joints, the energy consumption, or a combination thereof. Consequently, in various embodiments, the computer can select different trajectories and evaluate/simulate whether these trajectories satisfy the basic constraints (non-colliding trajectory that reaches one or more required points). Next, the computer can calculate a cost function and choose the trajectory with the lowest cost.

Consequently, once the computer has selected a given trajectory, in particular in the case where the robotic arm can follow the selected trajectory without colliding with the component and the obstacles, the computer automatically generates one or more movement instructions for the selected trajectory and sends the one or more movement instructions to the controller.

Consequently, in this way, the operator simply has to specify the points of interest with respect to the three-dimensional model of the component and the corresponding operations, and the computer automatically determines the alignment of the component with respect to the robotic arm, determines the trajectory to be followed to execute a given command, and generate the respective instructions that the controller then executes.

BRIEF DESCRIPTION OF THE DRAWINGS

The embodiments of the present disclosure will now be described with reference to the annexed drawings, which are provided purely by way of non-limiting example, and in which:

FIGS. 7 to 11 show details of the operating step of FIG. 6;

DETAILED DESCRIPTION

In the ensuing description, numerous specific details are provided to enable an in-depth understanding of the embodiments. The embodiments may be implemented without one or more of the specific details, or with other methods, components, materials, etc. In other cases, well-known operations, materials, or structures are not represented or described in detail so that the aspects of the embodiments will not be obscured.

Reference throughout this description to "an embodiment" or "one embodiment" means that a particular characteristic, distinctive element, or structure described with reference to the embodiment is comprised in at least one embodiment. Thus, the occurrence of phrases such as "in an embodiment" or "in one embodiment" in various points of this description do not necessarily all refer to one and the same embodiment. Moreover, the particular characteristics, distinctive elements, or structures may be combined in any adequate way in one or more embodiments.

The references used herein are provided merely for convenience and consequently do not define the sphere of protection or the scope of the embodiments.

Figure 1:
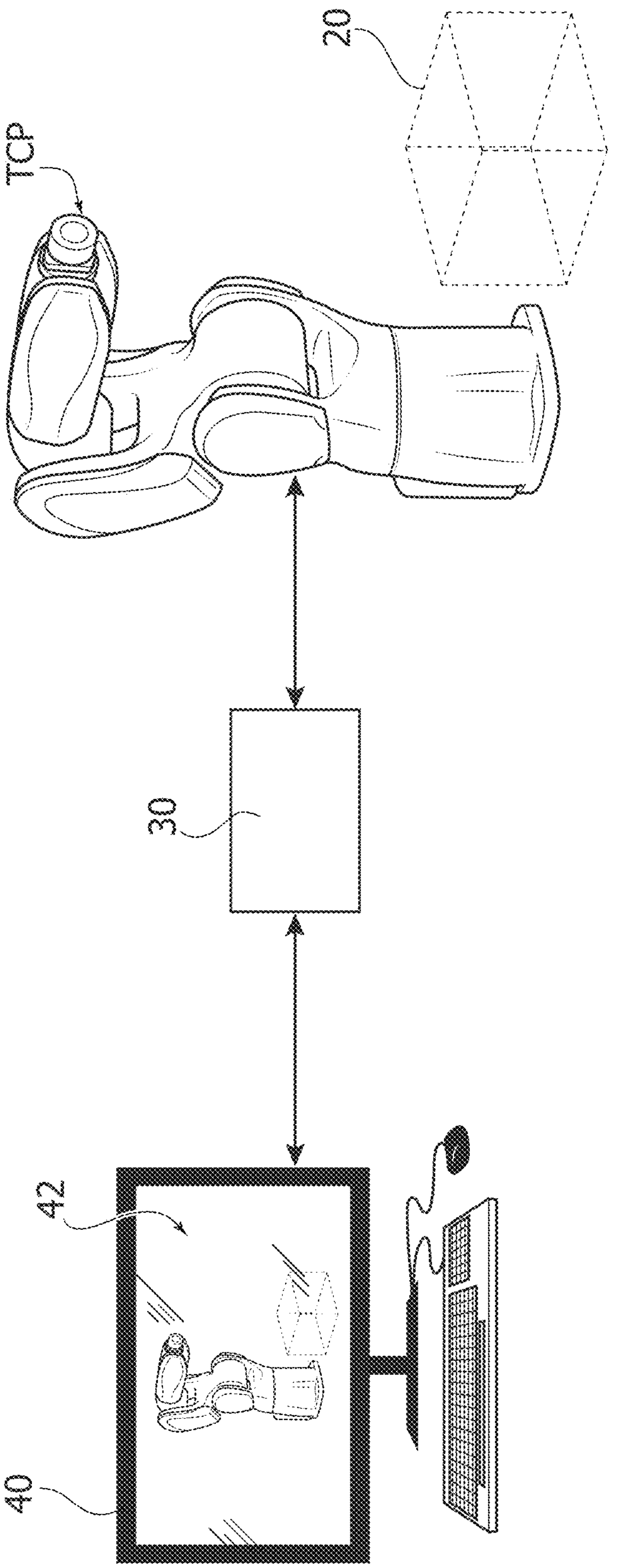
FIG. 1 shows an example of a control system of a robotic arm.
Figure 2:
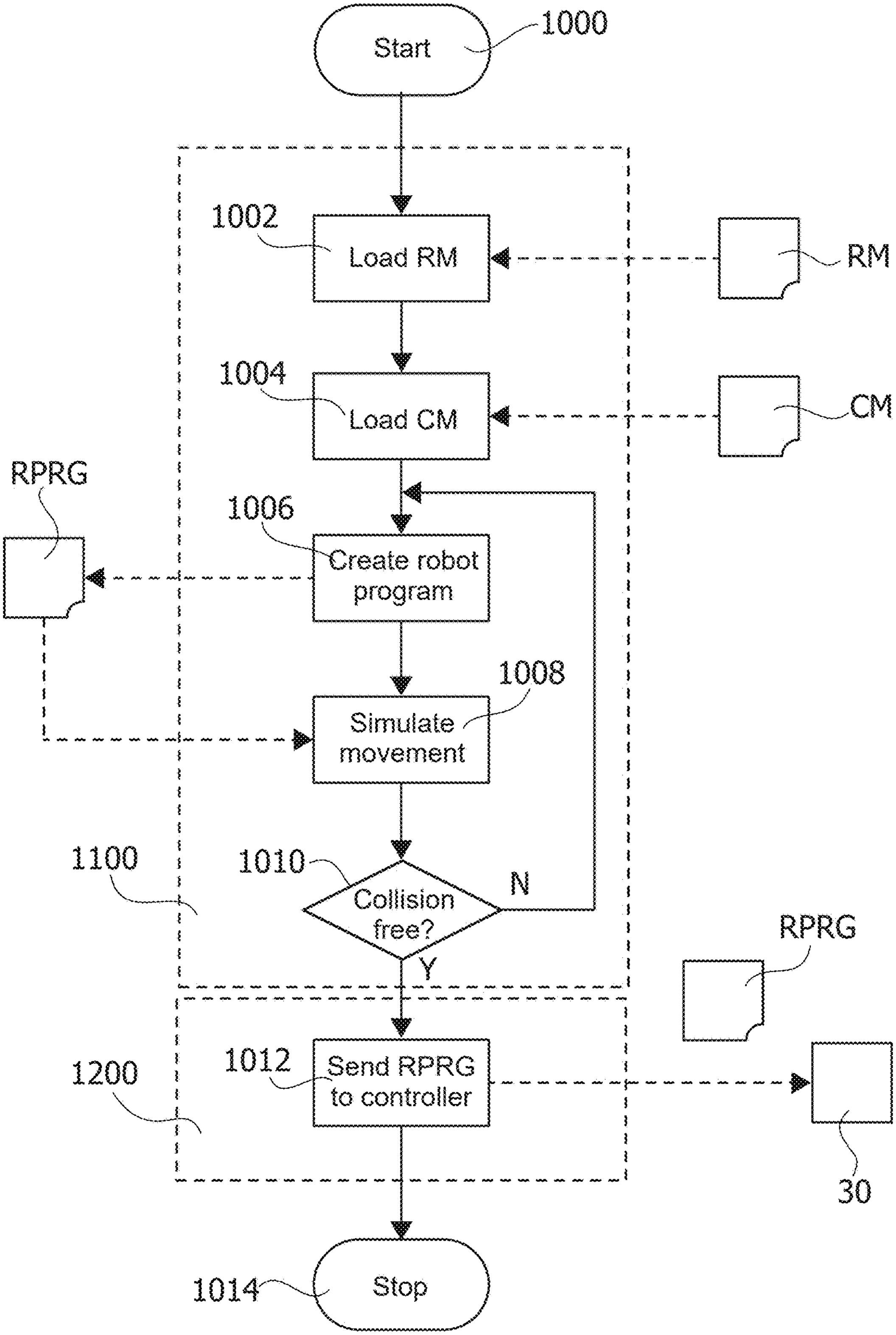
FIG. 2 shows an example of operation of a computer of the control system of FIG. 1.

In the ensuing FIGS. 3 to 13, the parts, elements, or components that have already been described with reference to FIGS. 1 and 2 are designated by the same references used previously in the aforesaid figures; the description of the above elements described previously will not be repeated hereinafter so as not to overburden the present detailed description.

As mentioned previously, the present description provides simpler solutions for controlling operation of a robotic arm.

Figure 3:
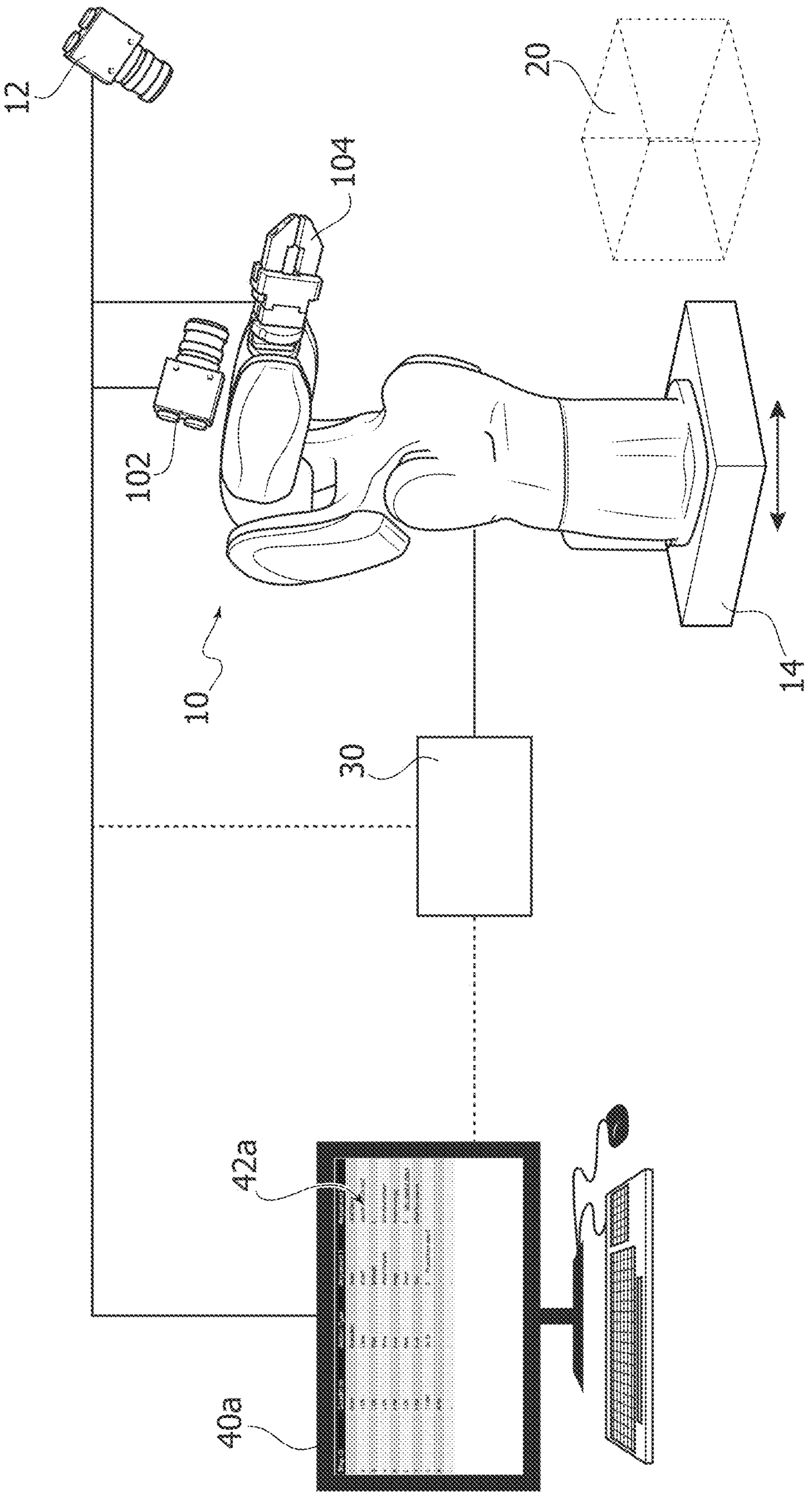
FIG. 3 shows an embodiment of a control system of a robotic arm according to the present disclosure.

FIG. 3 shows an embodiment of a control system of a robotic arm 10 in accordance with the present description.

In the embodiment considered, movement of the robotic arm 10 is controlled via a controller 30. For a general description of operation of the robotic arm 10 and of the controller 30 reference may be made to the previous description of FIG. 1.

In the present embodiment considered, mounted on the robotic arm 10 are sensors 102 that can be used for inspection of a component 20 and/or actuators 104 that can be used for machining or in general for handling the component 20.

Figure 4:
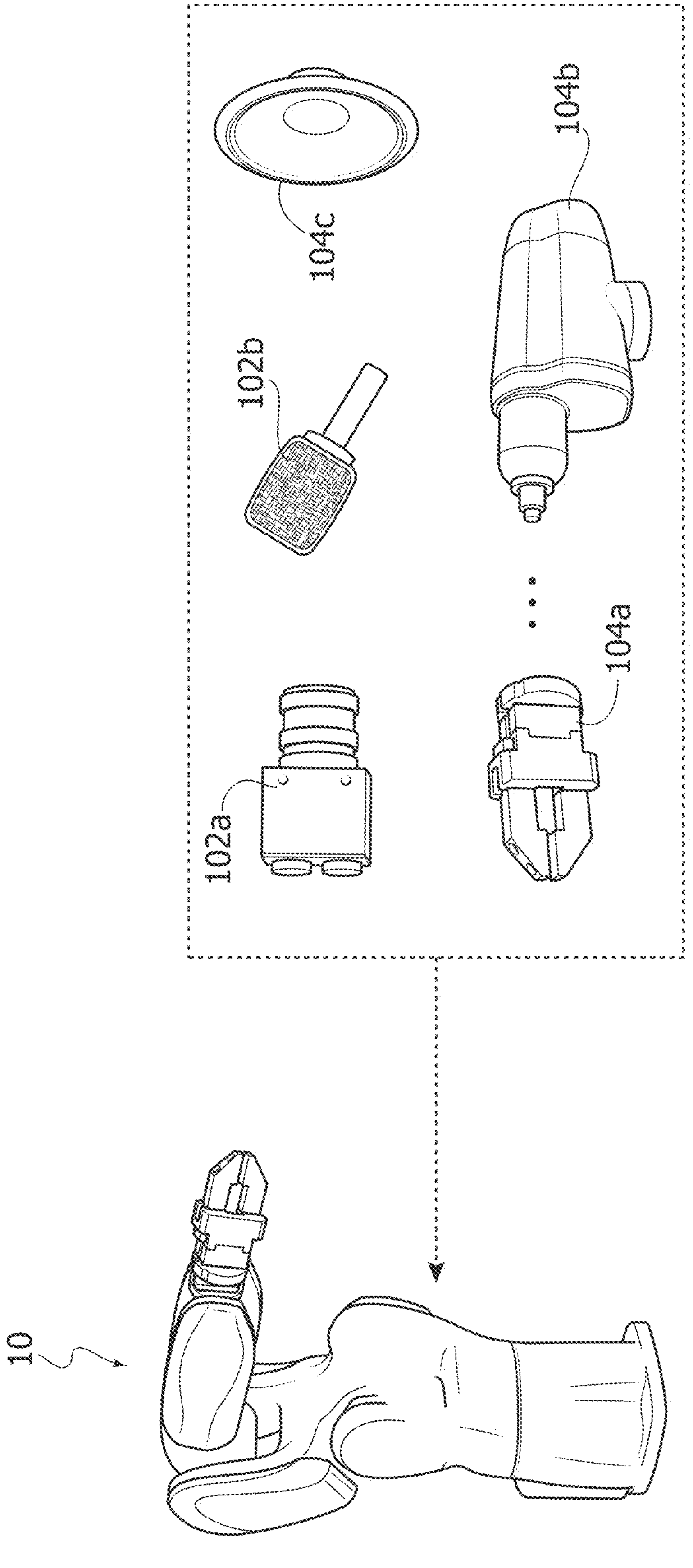
FIG. 4 shows embodiments of sensors and/or manipulators that can be mounted on the robotic arm of FIG. 3.

For instance, as schematically illustrated in FIG. 4, the sensors 102 may comprise one or more cameras 102*a* configured for acquiring images of at least a portion of the component 20, possibly also in different spectra, for example in the visible spectrum and/or in the infrared spectrum. In various embodiments, a plurality of cameras 102*a* may also be used for generating a depth image (or point cloud) of the component 20. In general, in addition or as an alternative to the cameras 102*a*, also other sensors may be used that are configured for supplying data that indicate the shape of the component 20, such as a LIDAR (light detection and ranging) sensor and/or a radar system.

In various embodiments, the sensors 102 may comprise also other sensors capable of detecting physical characteristics of the component 20. For instance, with reference to inspection of metal sheets, the sensors 102 may comprise at least one of the following:

- an ultrasonic transducer that can be used, for example, to check defects in the material and/or variations of the thickness of the metal sheet; and/or
- a testing hammer and an acoustic sensor, for example a microphone 102*b*, which can be used for a so-called tapping test.

Instead, the actuators 104 may comprise any actuator that is able to handle the component 20, for example to carry out machining, and/or to disassemble and/or assemble the component 20. For instance, schematically illustrated in FIG. 4 are a gripper 104*a* and an electric-power wrench 104*b*. However, the person skilled in the art will appreciate that the actuators 104 may comprise also other types of tools, for example a welder (a spot welder, a laser welder, or a welding gun), other gripping members (e.g., suction means), tools for applying substances (for example, glue or paint) on the component 20, etc.

In general, the sensors 102 (possibly working together with one or more of the actuators 104) may not only determine or verify physical properties of a mechanical component 20, but may also detect electrical characteristics or even more complex responses of the component 20. For instance, with reference to testing of electrical and/or electronic components 20, the sensors 104 may comprise sensors for measuring electrical characteristics of the component, for example a voltage, a current, and/or a resistance. Instead, with reference to more complex electronic components/devices 20, such as mobile phones, notebooks, or vehicle infotainment systems, the sensors 102 and actuators 104 may also be used for interacting with the electronic device 20, for example for pressing a button of the electronic device, reproducing an audio file via a speaker 104*c*, monitoring a visual response of the electronic device via a camera 102*a* or an acoustic response via a microphone 102*b*, etc.

In general, one or more sensors may also be installed in the environment of the component 20. For instance, FIG. 3 is a schematic illustration of a camera and/or a LIDAR sensor 12. Likewise, the environment may comprise actuators, for example a conveyor belt for conveying the component 20 to the robotic arm 10. However, in various embodiments, the robotic arm 10 may be mounted on a mobile platform 14 that makes it possible to move the robotic arm 10 in the environment, for example for moving the robotic arm 10 next to the component 20 and/or for moving the robotic arm 10 relative to the component 20. Consequently, in various embodiments, one or more of the sensors 102 used for inspection of the component 20 may be installed in the environment and/or be mounted on the mobile platform 14. For instance, in various embodiments, the platform 14 may be implemented in the form of an AGV (Automated-Guided Vehicle) or an AMR (Autonomous Mobile Robot). For instance, the use of a mobile platform 14 is particularly advantageous when the component 20 to be inspected or handled forms part of a larger object, such as a motor vehicle.

In the embodiment considered, the various sensors (e.g., 102 and 12) and actuators (e.g., 104 and the actuators of the mobile platform 14) are operatively connected to a computer 40*a*. In general, any communication system may be used for this purpose that comprises wired connections, for example via CAN bus and/or Ethernet, and/or wireless connections, for example via a Wi-Fi and/or a mobile network. In general, the computer 40*a* may communicate with the controller 30 also via this communication system or an additional communication channel. Moreover, in various embodiments, the computer 40*a* may communicate with at least a part of the sensors 102 and/or of the actuators 104 via the controller 30. Finally, operation of the computer 40*a* can be implemented also via a processing system that comprises one or more computers, which may be local (i.e., located in the environment where the robotic arm is installed or installed on the platform 14) and/or remote. Likewise, at least a part of operation of the controller 30 could also be implemented in the computer 40*a*.

As illustrated in FIG. 3, in various embodiments the computer 40*a* implements, for example via appropriate programming using software code, a development environment 42*a* that makes it possible to control operation of the controller 30 and hence of the robotic arm 10.

Figure 5:
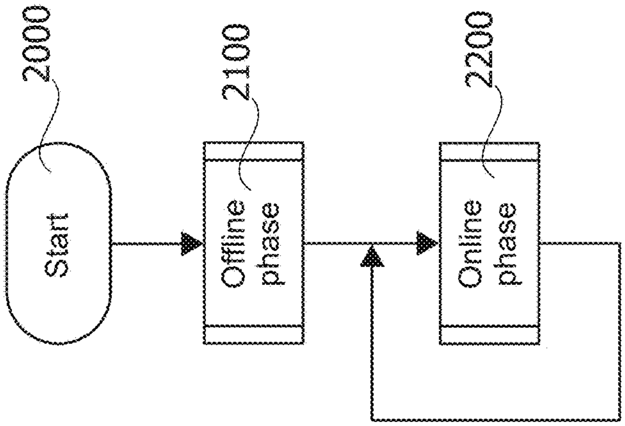
FIG. 5 shows a flowchart of an embodiment of operation of a computer of the control system of FIG. 3.
Figure 8:
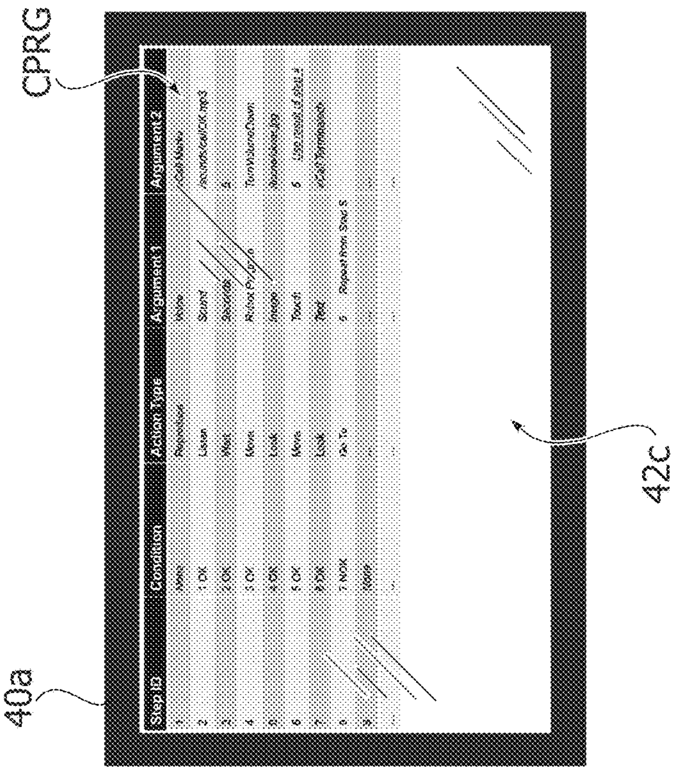

FIG. 5 shows an embodiment of the development environment 42*a*. In particular, after a start step 2000, the development environment 42*a* makes it possible to specify, in an offline step 2100, i.e., without interaction with the controller 30 and/or the robotic arm 10, operation of the robotic arm 10, of the sensors 12/102, and of the actuators 14/104. Next, the environment 42*a* envisages an online step 2200, where the computer 40*a* governs the robotic arm 10, drives one or more of the actuators 14/104, and receives the data from one or more of the sensors 12/102. In general, operation may then terminate, or (as schematically illustrated in FIG. 5) operation may then be repeated for other components 20.

Figure 6:
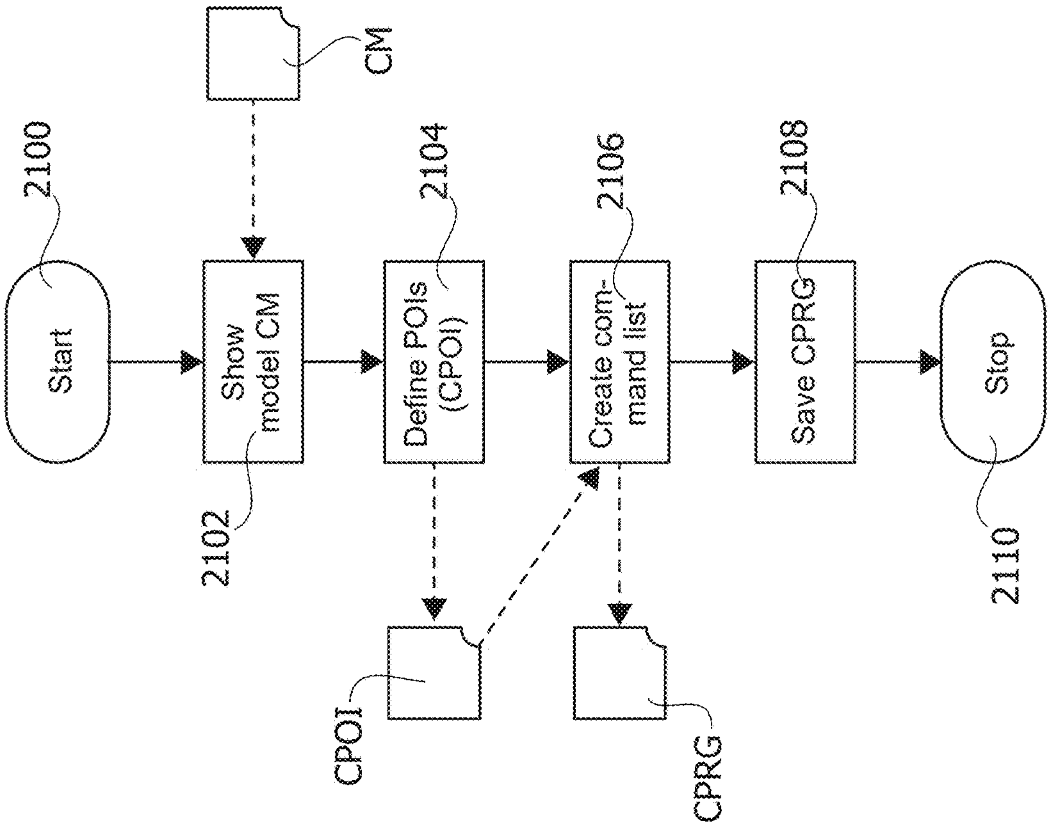
FIG. 6 shows an embodiment of an offline step of the operating method of FIG. 5.

FIG. 6 shows a first embodiment of the offline step 2100.

Figure 7:
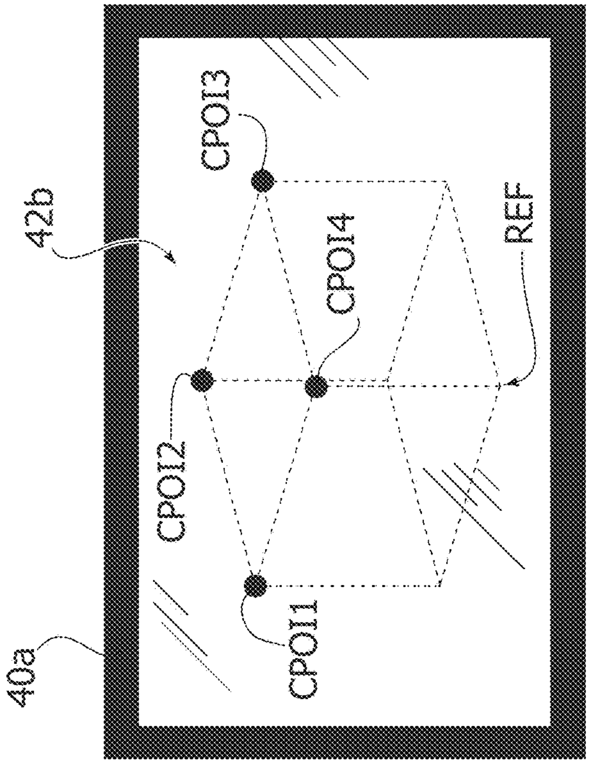

Once the step 2100 has been started, the computer 40*a* receives, in a step 2102, a model CM of the component 20, in particular comprising a 3D model of the component 20, such as a CAD model. Moreover, as also illustrated in FIG. 7, the computer 40*a* shows, in step 2102, the 3D model of the component 20 in a virtual environment 42*b*. For instance, like a traditional CAD environment, the virtual environment 42*b* may permit to display the 3D model, rotate and/or zoom in on the display, etc. As will be described in greater detail hereinafter, in various embodiments the three-dimensional model CM of the component 20 may be generated and/or updated by acquiring, via the sensors, one or more images and/or a point cloud of the component 20.

In a step 2104, an operator can then specify, in the virtual environment 42*b*, one or more points of interest CPOI; i.e., the computer 40*a* is configured to receive, in step 2104, one or more points of interest CPOI. In particular, for this purpose, the operator selects a given point in the 3D model, for example identified via cartesian coordinates x, y, and z of the virtual environment 42*b* with respect to a given reference point REF. For instance, as illustrated in FIG. 7, the reference point REF may correspond to the reference system of the CAD, or in general to a given position with respect to the model CM of the component 20. In particular, typically the above points CPOI are located on the surface of the 3D model of the component 20 and/or in given positions with respect to the surface of the model CM of the component 20. In various embodiments, the computer 40*a* also makes it possible to specify, for each point of interest CPOI, respective information of orientation, for example the so-called Robot Euler Angles or orientation data comprising pitch, roll, and yaw.

In various embodiments, the computer 40$a$ may also permit to select an area, for example a given surface of the model CM of the component 20, and the computer 40$a$ may automatically determine a plurality of points of interest CPOI as a function of the area selected, for example arranging a plurality of points of interest CPOI (more or less) equidistant in the area selected.

Consequently, in various embodiments, the computer 40$a$ receives, in step 2104, a list that comprises at least one point of interest CPOI, where each point of interest CPOI is identified via respective coordinates, for example x, y, and z, with respect to the reference point REF, and possibly orientation data. For instance, in FIG. 7, the operator chooses four points CPOI1, CPOI2, CPOI3 and CPOI4. In various embodiments, the list may also comprise a field that makes it possible to specify a unique identifier for each point of interest. For instance, for simplicity, it is assumed that the points CPOI1, CPOI2, CPOI3, and CPOI4 have the identifiers "CPOI1", "CPOI2", "CPOI3", and "CPOI4", respectively.

In a step 2106, the operator then opens a programming environment 42$c$ (see also FIG. 8), where the operator enters and/or modifies a program CPRG made up of a sequence of commands CMD. In general, the programming environment 42$c$ can be integrated with the virtual environment 42$b$ in a single program/development environment 42$a$, or else two separate programs/environments may be envisaged.

In particular, in various embodiments, the development environment makes it possible to specify high-level commands CMD. For instance, FIG. 9 shows an example of a program CPRG. In particular, in various embodiments, each command CMD comprises:

- a unique identifier SID that specifies the number of the respective command CMD;
- a condition CON that specifies the condition when the respective command CMD is started;
- a type of action AT, which specifies the action to be performed for the respective command CMD; and
- one or more fields ARG, for example fields ARG1 and ARG2, which permit to specify of one or more parameters of the respective action AT.

In general, the unique identifier SID may also be specified implicitly via the number of the command CMD, for example a row number.

In particular, in various embodiments, at least one type of action AT comprises a value that specifies a movement of the robotic arm 10, and wherein a parameter ARG permits to indicate one of the points of interest CPOI. For instance, in various embodiments, a generic command with the action AT="MOVE" is used, and the first parameter ARG1 indicates the fact that movement has to reach a point of interest CPOI, for example by specifying as parameter ARG1 the value "POI", and the second parameter makes it possible to specify the identifier of one of the points CPOI. However, in general, an action AT, for example "MOVEPOI", could specifically regard movement at a point of interest. Consequently, in this case the first parameter ARG1 could specify directly the identifier of one of the points CPOI.

In various embodiments, the computer 40$a$ may also automatically generate (at least in part) the sequence of commands CPRG. For instance, as mentioned previously, the computer 40$a$ may also permit to select an area, for example a given surface of the model CM of the component 20, and the computer 40$a$ may automatically determine a plurality of points of interest CPOI as a function of the area selected. Consequently, in this case the computer may generate a sequence of commands CPRG in order to reach sequentially all the points of interest CPOI determined for the area selected. Moreover, by indicating a given inspection or a given handling operation for the area, the computer could also automatically generate respective inspection and/or handling commands to be carried out in the points of interest CPOI.

In general, the list of possible other actions AT depends upon the sensors 102 and upon the actuators 104 that are mounted on the robotic arm 10. Described hereinafter is an example of possible actions for testing electronic devices 20 that comprise a touchscreen, such as a mobile phone, a tablet, or an infotainment system of a vehicle.

For instance, in this case the sensors 102 may comprise a camera 102$a$ and a microphone 102$b$, and the actuators may comprise a speaker 104$c$ and an actuator for operating a touchscreen, for example in the form of a pen or a finger.

For instance, in this case the action AT of movement "MOVE" may comprise a second sub-action, for example specified via the parameter ARG1="Touch", wherein the robotic arm 10 should touch the touchscreen with the pen or the finger, for example by specifying with the parameter ARG2 the position to be touched.

In various embodiments, the action AT "MOVE" may also permit to specify movement instructions like for conventional programming of a robotic arm. However, since the commands CMD are simple, in this case the first parameter ARG1 specifies only the fact that it is a movement program, for example by using ARG1="Robot Program", and the parameter ARG2 specifies the name of a file that comprises the respective instructions, for example with the PDL2 language. In particular, in various embodiments, the instructions of the program refer to the position REF of the 3D model of the component 20 and/or regard instructions of relative movement with respect to the current position of the robotic arm 10. For instance, as is in itself known, the movement instructions can be entered manually and/or be recorded automatically by moving the robotic arm 10 manually or via a user interface, i.e., a so-called teach pendant.

Consequently, in the embodiment considered, the action AT "MOVE" comprises the actions that imply a movement of the robotic arm 10 and may comprise:

- a movement into a given point of interest CPOI;
- a predetermined movement, such as the sub-action "Touch"; and/or
- a movement according to a traditional control program of the robotic arm 10, for example using the sub-action "Robot Program".

Likewise, other actions AT may refer to the use of the camera 102$a$, of the microphone 102$b$, and/or of the speaker 104$c$. For instance, in various embodiments, an action AT "Look" may control operation of the camera 102$a$ and comprise one or more of the following sub-actions specified via the parameter ARG1:

- a sub-action "Get", in which the computer 40$a$ acquires an image from the camera 102$a$, where the parameter ARG2 could specify the index or name of one of the cameras 102$a$ (in the case where a plurality of cameras 102$a$ are provided);
- a sub-action "Image", in which the computer 40$a$ acquires one or more images and seeks the position of an image identified via the parameter ARG2, which specifies, for example, the filename of an image; and/or
- a sub-action "Text", where the computer 40$a$ acquires one or more images and seeks the position of a given text identified via the parameter ARG2, using for this purpose an OCR (Optical Character Recognition) algorithm.

Likewise, in various embodiments, an action AT "Listen" may control operation of the microphone 102*b* and comprise one or more of the following sub-actions specified via the parameter ARG1:

- a sub-action "Sound", in which the computer 40*a* acquires an audio recording and checks whether the audio recording comprises an acoustic profile identified via the parameter ARG2, which specifies, for example, the filename of an audio file; and/or
- a sub-action "Voice", in which the computer 40*a* acquires an audio recording and checks whether the audio recording comprises a given text identified via the parameter ARG2, using for this purpose a speech-recognition algorithm.

Finally, in various embodiments, an action AT "Reproduce" may control operation of the speaker 104*c* and comprise one or more of the following sub-actions specified via the parameter ARG1:

- a sub-action "Sound", in which the computer 40*a* reproduces an audio file identified via the parameter ARG2; and/or
- a sub-action "Voice", in which the computer 40*a* reproduces a given text identified via the parameter ARG2, using for this purpose a speech-synthesis method.

Consequently, with the instructions indicated previously it is possible to test the most common functions of electronic devices 20 that comprise a touchscreen. For instance, FIG. 9 shows an example of the program CPRG, where:

- the command CMD1 requests the speech synthesis of the text "Call Mark";
- the command CMD2 requests comparison of the following audio profile with the audio profile specified in the audio file callOK.mp3, for example a profile that corresponds to the sound of a phone call;
- the command CMD3 corresponds to an optional wait step;
- the command CMD4 requests a movement into the position CPOI1;
- the command CMD5 requests checking whether the image acquired for the respective position comprises the image "close.jpg";
- the command CMD6 requests touching of the screen, in particular in the position of the image "close.jpg" detected with the command CMD5 (ARG2=5);
- the command CMD7 requests checking whether the image acquired for the respective position comprises the text "Call Terminated"; and
- the command CMD8 jumps back to the command CMD4 in the case where the result of the command CMD7 was not positive.

Consequently, as illustrated in the example, the condition CON makes it possible to specify the condition when the respective command CMD is executed and may comprise the identifier of a command CMD and the required result, e.g., "OK" or "NOK". Moreover, in order to permit more complex sequences, in various embodiments, an action AT, for example "Go To", permits to specify the identifier of a command CMD, and the program CPRG should jump directly to this command CMD. Consequently, in this way, sub-programs may be implemented that are conditioned by the result of one or more of the previous commands CMD.

Instead, with reference to testing of metal sheets, for example by means of a camera 102*a*, a tap-test hammer and/or an ultrasonic transducer, the camera 102*a* can be controlled again with the action "Look". Instead, in various embodiments, an action AT "Tap" can control in parallel the action of the tap-test hammer and acquisition of a respective audio file, for example by means of one or more of the following sub-actions specified via the parameter ARG1:

- a sub-action "Sound", in which the computer 40*a* operates the tap-test hammer, acquires an audio recording, and checks whether the audio recording comprises an acoustic profile identified via the parameter ARG2, which specifies, for example, the filename of an audio file; and/or
- a sub-action "Get", in which the computer 40*a* operates the tap-test hammer and acquires the audio recording and saves the recording with the filename indicated via the parameter ARG2.

Likewise, in various embodiments, an action AT "Ultrasound" may control, in parallel, operation of the ultrasonic transmitter and acquisition of the corresponding signal by the ultrasonic receiver, for example by means of one or more of the following sub-actions specified via the parameter ARG1:

- a sub-action "Get Thickness", in which the computer 40*a* measures, via the transducer, the thickness of the metal sheet and saves the result in the file indicated via the parameter ARG2; and/or
- a sub-action "Thickness", in which the computer 40*a* measures, via the transducer, the thickness of the metal sheet and checks whether the metal sheet has a given thickness.

Consequently, with the instructions mentioned previously, it is possible to test the mechanical characteristics of a metal sheet, for example the metal sheet of a vehicle or an aircraft. For instance, FIG. 10 shows an example of the program CPRG, where:

- the command CMD1 requests a movement into the position CPOI1;
- the command CMD2 requests acquisition of an image that is saved as "cpoi1.jpg";
- the command CMD3 requests a tapping test, and checks whether the respective audio profile corresponds to the file "cpoi1.mp3";
- the command CMD4 requests operation of the ultrasonic transducer to check whether the thickness of the metal sheet corresponds to 200 μm (ARG2=200);
- the command CMD5 requests a movement into the position CPOI2;
- the command CMD6 requests acquisition of an image that is saved as "cpoi2.jpg";
- the command CMD6 requests a tapping test, and checks whether the respective audio profile corresponds to the file "cpoi2.mp3"; and
- the command CMD8 requests operation of the ultrasonic transducer to check whether the thickness of the metal sheet corresponds to 200 μm (ARG2=200).

Consequently, in the embodiment considered, the computer 40*a* can save the program CPRG, in a step 2108. In particular, in various embodiments, the program CPRG corresponds to a list of commands, where each command CMD comprises a given number of fields. Consequently, the aforesaid program CPRG corresponds to a high-level programming meta-language and can be saved in any list or table format, for example in the form of an Excel file, a CSV file, an XML file, etc. Finally, the step 2100 terminates in an end step 2110. Likewise, the computer 40*a* stores, in step 2108, the data of the points of interest CPOI. Also for this purpose any list or table format may be used, such as an Excel file, a CSV file, an XML file, etc.

Figure 11:
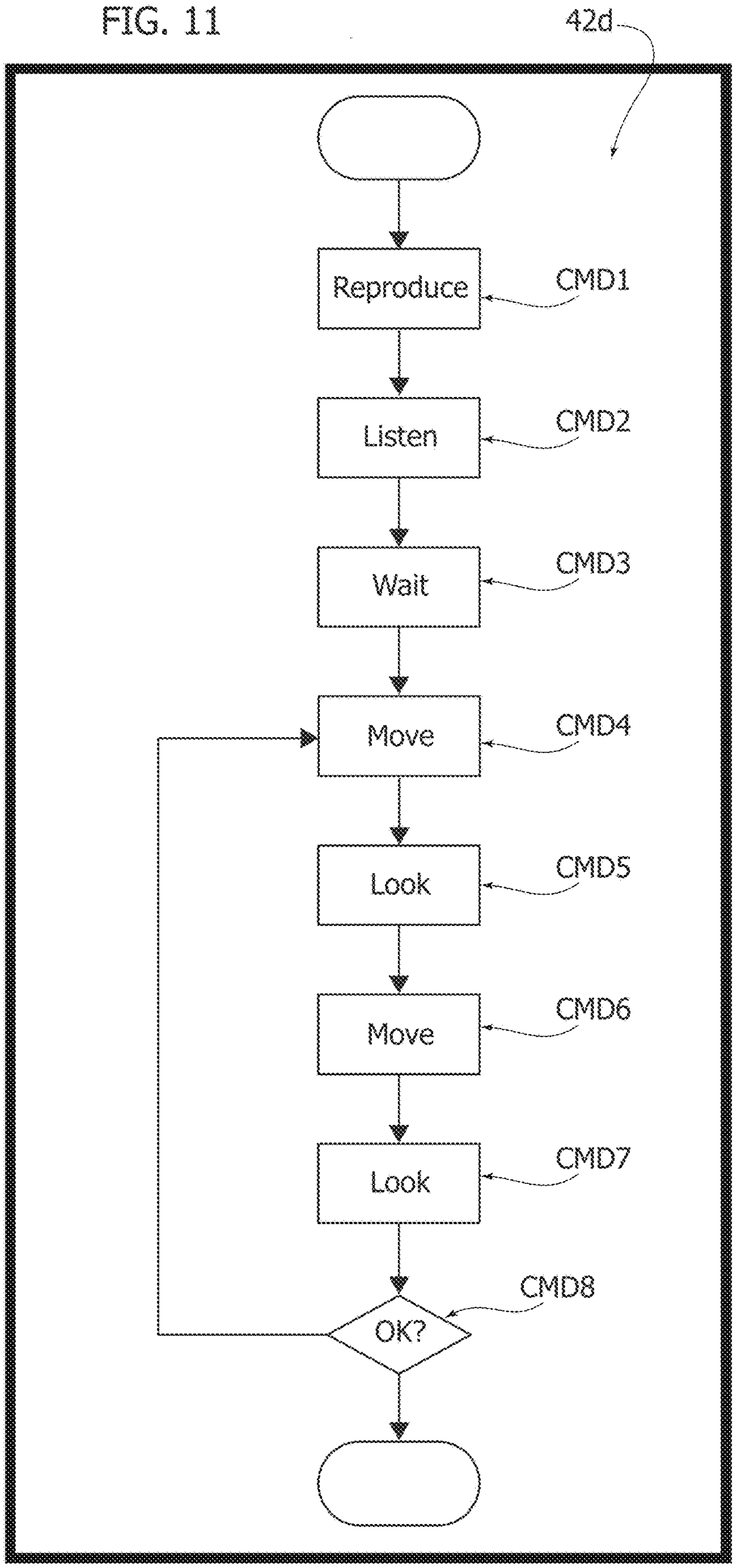

As illustrated in FIG. 11, in addition or as an alternative to the specification of the behavior of the system via a list of commands CMD, the development environment 42*c* may comprise a graphic interface 42*d* for specifying operation of the program CPRG via a flowchart. For instance, for this purpose, the operator can draw a traditional flowchart comprising steps/processes and verification/decision steps.

In particular, in various embodiments, the interface 42*c* makes it possible to specify, for each step/process, the respective action AT and the respective parameters ARG, for example via a window that shows the properties of the step/process. For instance, steps/processes for the commands CMD1-CMD7 of FIG. 9 may be provided in this way.

In particular, in the embodiment considered, the interface does not permit to specify the condition CON for each step/process, but a verification/decision step is provided that makes it possible to verify the result of the previous step/process. For instance, in this way a verification/decision step for the command CMD8 may be envisaged.

Consequently, in various embodiments, the computer receives, in step 2106, data that identify a flowchart, and translates this flowchart into a corresponding sequence of commands CMD, thus generating the program CPRG. Likewise, the computer 40*a* may receive a program CPRG and automatically generate a corresponding flowchart to facilitate an understanding of the program CPRG. Consequently, in various embodiments, the development environment may be able to switch, for the same program CPRG, between a view 42*c* in the form of a list and a view 42*d* in the form of a flowchart.

Consequently, as compared to the operation of FIG. 2, in various embodiments the development environment 42*a* does not simulate, during step 2100, operation of the robotic arm 10, but an operator can specify via simple high-level commands and/or a flowchart, movement of the robotic arm 10, acquisition of data via the sensors 102, and/or driving of the actuators 104.

Figure 12:
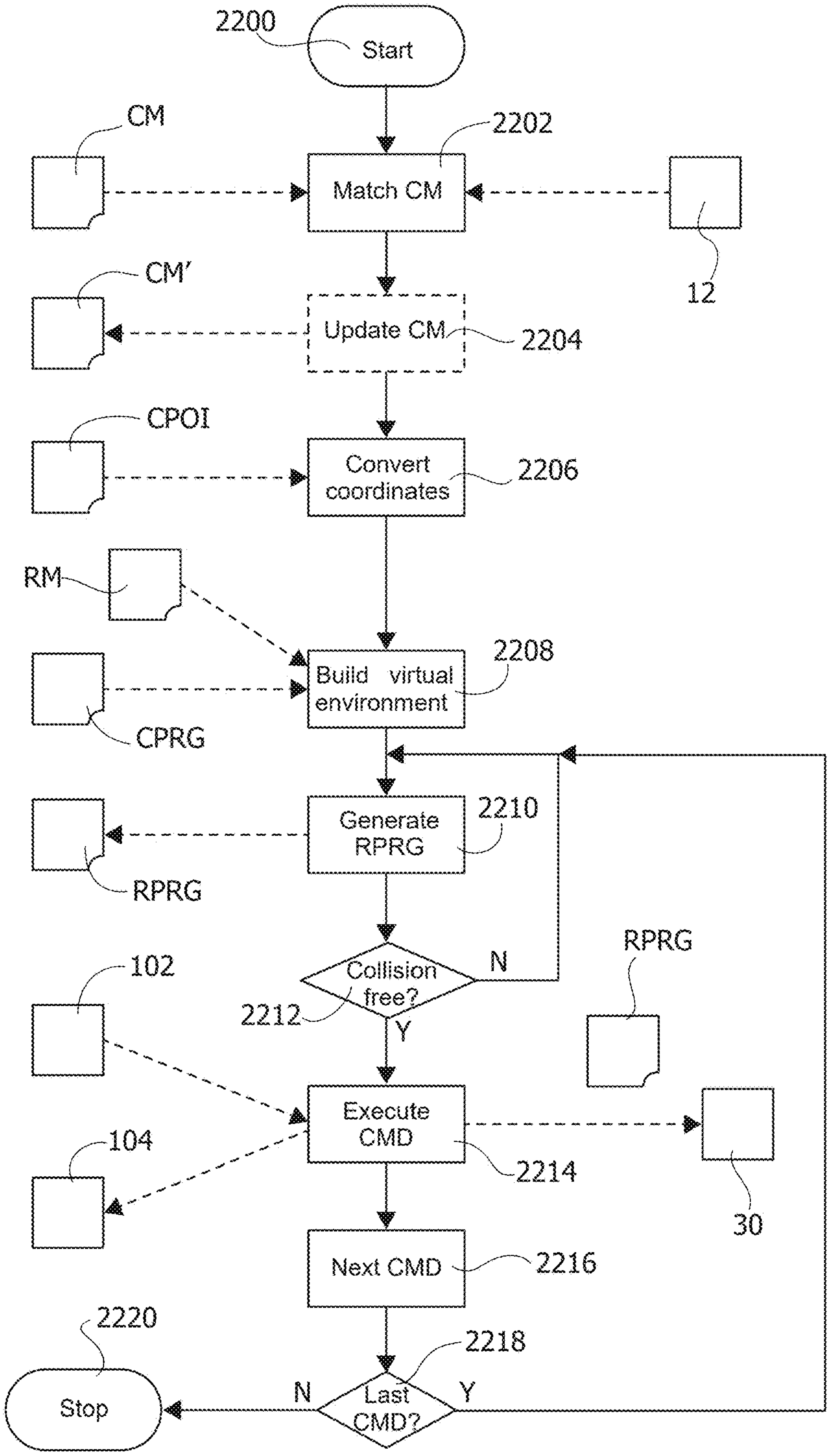
FIG. 12 shows an embodiment of an online step of the operating method of FIG. 5.

FIG. 12 shows an embodiment of the online step 2200, i.e., of control of the robotic arm 10 and of the sensors 102 and/or actuators 104.

In particular, once step 2200 has been started, the computer 40*a* obtains, in a step 2202, the model CM of the component 20 and further data acquired by the sensors 102 mounted on the robotic arm 10 and/or by the sensors 12 installed in the environment and/or by the sensors mounted on the platform 14. In particular, in step 2202, the computer 40*a* is configured for reconstructing a 3D model of the component 20 using for this purpose the data supplied by the above sensors. Likewise, the computer 40*a* can reconstruct a 3D model of the environment in which the robotic arm 10 and the component 20 are located, for example with reference to possible obstacles. Consequently, for this purpose, the computer 40*a* may use one or more cameras, LIDAR sensors and/or radars, mounted on the robotic arm 10, and/or in the environment, and/or on the platform 14.

In various embodiments, the computer 40*a* is configured for comparing, in step 2202, the model CM with the reconstructed model in such a way as to identify the reference position REF of the model CM of the component 20 in the reference system of the robotic arm 10. For instance, for this purpose, the computer 40*a* can carry out an operation of matching between the model CM and the reconstructed model. For instance, for this purpose, the document by Tolga Birdal and Slobodan Ilic, "A point sampling algorithm for 3D matching of irregular geometries", IEEE/RSJ International Conference on Intelligent Robots and Systems (IROS), IEEE, 2017 may be cited. Consequently, once the position of the robotic arm 10 is known and/or the position of the mobile platform 14 has been detected, the computer 40*a* is able to determine the relative position of the component 20 with respect to the robotic arm 10. Consequently, once the reference position REF of the model CM and the current position of the component 20 are known, the computer 40*a* can calculate the position of the reference REF in the reference system of the robotic arm 10.

Optionally, the computer may generate, in a step 2204, also a modified/updated model CM' of the component 20 as a function of the data acquired and possibly of the original model CM.

Figure 13A:
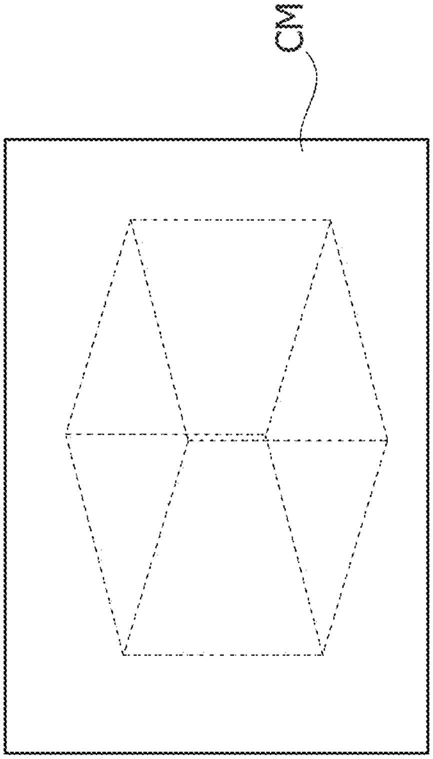
FIGS. 13A, 13B, 13C and 13D show details of the operating step of FIG. 12.
Figure 13B:
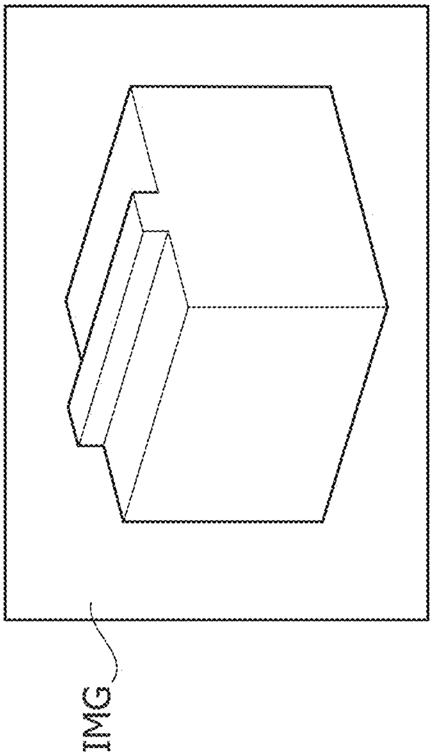
Figure 13C:
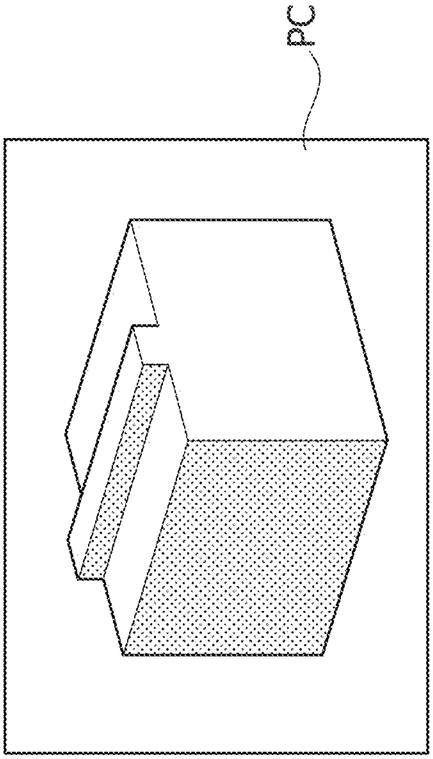
Figure 13D:
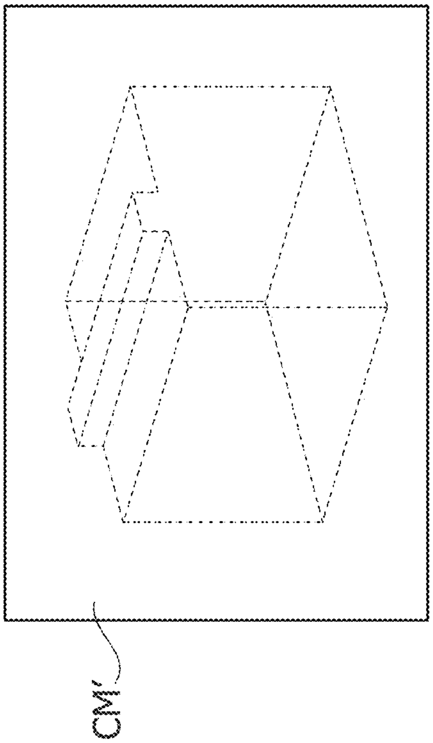

For instance, this is illustrated in FIGS. 13A, 13B, 13C, and 13D. In particular, FIG. 13A shows an example of the model CM of the component 20, FIG. 13B shows an example of an image IMG acquired by a camera 102*a* and/or 12 of the component CM, and FIG. 13C shows an example of a point cloud of the component 20, for example a depth image acquired via a stereo camera 12 and/or by moving the camera 102*a* into different positions, and/or using a LIDAR sensor or a radar.

Consequently, in various embodiments, the computer 40*a* may combine the information IMG and/or PC with the model CM in such a way as to generate a modified model CM'. For instance, in this way it is possible to detect objects that are fixed to the component 20 but are not contemplated in the original model 20. For instance, with reference to a vehicle, the computer 20 could detect other objects that are fixed to the vehicle, for example a roof rack. Likewise, the computer 40*a* can then generate and/or update a 3D model of the environment, in particular of possible obstacles that are located close to the robotic arm 10 and/or the component 20.

In particular, in various embodiments, the computer 40*a* can carry out a first scan of the component 20 to generate the model CM of the component 20 and/or to obtain an updated model CM' of the component. Next, the operator can specify the points of interest and the commands using the model CM or the updated model CM' of the component 20. Consequently, in this case the computer 40*a* can carry out a second scan of the component to align the model CM (and the respective points of interest CPOI) with the (real) position of the component 20.

Consequently, at the end of step 2202, the computer 40*a* has determined the reference position REF in the reference system of the robotic arm 10 and possibly updated the model CM' of the component 20. In a step 2026, the computer 40*a* then receives the points of interest CPOI, for example by opening the respective file. Consequently, once the reference position REF with respect to the reference system of the robotic arm 10 and the coordinates of the points CPOI with respect to the reference position REF are known, the computer 40*a* calculates, in step 2206, the coordinates and possibly the information of orientation of the points CPOI in the reference system of the robotic arm 10.

In the embodiment considered, the computer 40*a* receives, in a step 2208, also the program CPRG, for example by opening the respective file, also selecting the first command CMD1. In particular, as mentioned previously, the program CPRG typically comprises only high-level instructions that do not correspond to instructions for movement of the robotic arm 10; i.e., the commands CMD cannot be interpreted by the controller 30. Consequently, in various embodiments, the computer 40*a* pre-processes the selected command CMD, e.g., CMD1, in a step 2210 to check whether the respective command CMD requests a movement of the robotic arm 10.

In the case where the selected command does not request driving of the robotic arm (output "Y" from a verification step 2212), the computer 40*a* proceeds to a step 2214, where it interacts with the sensors 102 and/or actuators to carry out the command, for example to acquire the data from one or more sensors 102 (and possibly process these data, for example process an acquired image or an acquired audio file) and/or to drive one or more actuators 104 (for example, to reproduce an audio file, to carry out the tapping test, and/or to detect thickness).

Instead, in the case where the selected command requests driving of the robotic arm 10, the computer **40*a* automatically determines, in step 2210, instructions RPRG for the controller 30, i.e., instructions in the programming language of the controller 30, to obtain the requested movement. For instance, in various embodiments, the computer 40*a* generates movement instructions that specify respective destination points/setpoints, for example via cartesian data or data in the space of the joints, and the controller 30** is configured for solving the inverse kinematics.

Consequently, the instruction sequence RPRG corresponds to a sub-program that comprises only the instructions of movement of the robotic arm 10 required for the command selected.

In particular, for this purpose, the computer **40*a* generates, in step 2210, a virtual environment, positioning the model RM of the robotic arm 10 in the virtual environment, which possibly comprises also the 3D models of other obstacles in the environment. In general, this virtual environment may also correspond to the virtual environment 42*a* used to determine the points of interest. Moreover, the computer 40*a* positions in the virtual environment also the model CM (preferably, the updated model CM') using for this purpose the position of the reference REF determined in step 2202, i.e., the position of the model CM with respect to the reference system of the robotic arm 10. Consequently, in various embodiments, the computer 40*a* positions the models RM and CM (and possible further models of obstacles) automatically on the basis of the relative positioning detected in step 2202**.

Consequently, once the position of the robotic arm 10 is known (possibly by acquiring the corresponding data from the controller 30 and/or from the mobile platform 14), the computer **40*a* can evaluate, in step 2210, movement of the model RM of the robotic arm 10** for one or more trajectories to carry out the requested action of movement, for example to reach a point of interest CPOI in order to carry out the action of "Touch" or to carry out a predetermined program with the parameter "Robot Program".

For instance, in various embodiments, the program RPRG may correspond to the instructions of the controller 30 for following a given trajectory, for example identified via a sequence of setpoints. Consequently, in this case the computer **40*a* can select, in step 2210**, a trajectory, generate the respective movement instructions RPRG and evaluate/simulate the movement.

Consequently, in this case the computer **40*a* can verify, in step 2212, whether the selected trajectory implements the requested movement, for example because the (simulated) robotic arm performs the requested movement and does not collide with an object in the virtual environment, for example the model CM (or preferably CM') of the component 20 and/or one or more models of other objects in the environment. Consequently, in the case where the selected trajectory fails to implement the requested movement (output "N" from the verification step 2212), the computer returns to step 2210 in order to select another trajectory and/or generate another instruction sequence RPRG. Consequently, the computer 40*a* generates, via the steps 2210 and 2212, a trajectory that avoids obstacles (collision-avoidance) using for this purpose the scene that comprises the models CM and RM positioned via alignment of the model CM with the information acquired via the sensors 102/12**, and possibly one or more models of other objects in the environment.

For instance, for this purpose the computer **40*a* may define, in step 2212, an optimization problem by adding as constraints all the obstacles present in the second virtual environment and constraints due to the process (for example, the position and possibly the orientation of the point of interest or of the points of interest to be reached, possible constraints with reference to the distance from the surface of the component and/or from other obstacles, etc.), and optionally select an optimized trajectory according to a given cost function, such as the distance covered, the inertia on the joints, the energy consumption, or a combination thereof. Consequently, in various embodiments, the computer 40*a* may determine, in step 2212, one or more trajectories that meet the basic constraints (collision-avoidance trajectory that reaches one or more requested points). Next, in various embodiments, the computer may calculate a cost function and select the trajectory with lowest cost. Consequently, in the case where the computer 40*a* is not able to determine a trajectory that is able to implement the requested movement (output "N" from the verification step 2212), for example because a given maximum number of trajectories has been evaluated, the computer 40*a*** may also display a screenful, in which the operator can modify one or more of the points of interest CPOI and/or modify the constraints for the optimization problem.

Consequently, in the case where the simulated movement corresponds to the requested movement (output "Y" from the verification step 2212), the computer **40*a* proceeds to step 2214. However, in this case, apart from possible interactions required for the sensors 102 and/or actuators 104, the computer 40*a* sends the program RPRG to the controller 30, which then executes the instruction sequence RPRG to control movement of the robotic arm 10**.

In general, with reference to the movement of the robotic arm 10, a given command CMD may request:

- only a movement of the robotic arm 10 along the selected trajectory without interaction with the sensors 12/102 and/or actuators 104;
- movement of the robotic arm 10 along the selected trajectory to reach a given final position, and subsequently an interaction with the sensors 12/102 and/or actuators 104 once the robotic arm has reached the final position; or
- movement of the robotic arm 10 along the selected trajectory and, in parallel, interaction with the sensors 12/102 and/or actuators 104.

For instance, to acquire images of the surface of the component 20, the sequence of commands CMD could comprise pairs of commands, in which a first command requests movement in a respective point of interest and a second command requests acquisition of an image. Consequently, in this case the movement of the robotic arm 10 is interrupted to acquire the image.

Alternatively, a first command could request movement into a given initial position, and a second command could request a movement into a given final position with parallel acquisition of images. For instance, for this purpose the computer **40*a* may periodically monitor (via the controller 30) the position of the robotic arm 10, in particular of the TCP, and carry out one or more operations identified via the commands CMD, for example acquire images, when the robotic arm 10** reaches given positions, for instance when the robotic arm reaches given setpoints of the trajectory identified via the instructions RPRG.

For example, in this case the camera should be kept at a certain distance from the surface of the component 20. Consequently, in various embodiments, in particular with reference to commands CMD that request interaction with the sensors and/or actuators during movement of the robotic arm 10, the computer 40*a* may be configured for generating, in step 2212, one or more constraints for the trajectory as a function of the command CMD to be executed.

Once interaction with the sensors 102/12, the actuators 104/14 and/or the controller 30 is terminated, the computer 40*a* then selects, in a step 2216, a subsequent command CMD, possibly using for this purpose the field CON, which indicates the condition for execution of a command CMD.

Consequently, in a step 2218, the computer 40*a* can check whether the command CMD executed was the last command of the program CPRG. In the case where there are one or more further commands CMD in the program CPRG (output “Y” from the verification step 2218), the computer 40*a* then returns to step 2210. Instead, in the case where the command CMD executed was the last command of the program CPRG (output “N” from the verification step 2218), the phase 2200 terminates at an end step 2220.

Consequently, in the embodiment considered, the computer 40*a* automatically determines the position/alignment of the component 20 with respect to the robotic arm 10, and uses the virtual environment (with the models CM and RM, and possible further models of obstacles and/or of the environment) to determine automatically the trajectory to be followed by the robotic arm 10, in particular to carry out the movement requested by the current command CMD of the program CPRG. Consequently, in this way the operator does not have to generate manually the virtual environment 42, and in particular position the component 20 with respect to the robotic arm 10, and does not have to generate the instructions of the controller 30 to carry out movements. Instead, the operator may simply specify, via a graphic interface, possible points of interest CPOI (or other information that enables automatic generation of the points of interest CPOI) and then use a graphic interface 42*b* and/or 42*c* that makes it possible to specify via commands CMD macro-operations that are then executed automatically by the computer 40*a* by interacting for this purpose with the sensors 102, the actuators 104, and/or the controller 30, i.e., the robotic arm 10.

Of course, without prejudice to the underlying principles of the invention, the details of construction and the embodiments may vary widely with respect to what has been described and illustrated herein purely by way of example, without thereby departing from the scope of the present invention, as defined in the annexed claims.

The invention claimed is:

1. A method for inspecting and/or handling a component (20) via a robotic arm (10), wherein movement of said robotic arm (10) is managed via a controller (30) as a function of movement instructions, in which said movement instructions specify one or more points of a trajectory in a reference system of the robotic arm (10), wherein one or more sensors (102, 12) are mounted on at least one of said robotic arm (10), or are installed on a platform (14) on which said robotic arm (10) is mounted, or are installed in an environment in which said robotic arm (10) is positioned, wherein said controller (30) and said one or more sensors (102, 12) are in communication with a computer (40*a*), the method comprising:

a) during a first offline phase (2100):

receiving a three-dimensional model (CM) of said component (20);

showing said three-dimensional model (CM) of said component (20) in a first virtual environment (42*b*) having a given reference system (REF), in which said first virtual environment (42*b*) is configured to allow specification of one or more points of interest (CPOI);

receiving said one or more points of interest (CPOI) in said reference system (REF) of said first virtual environment (42*b*), wherein each point of interest (CPOI) has a respective identifier and respective coordinates in said reference system (REF) of said first virtual environment (42*b*);

showing a graphic interface (42*c*; 42*d*) configured to specify a sequence of commands (CPRG) comprising a plurality of commands (CMD) configured to interact with at least one of said robotic arm (10) or said one or more sensors (102, 12), wherein said graphic interface (42*c*; 42*d*) comprises at least one of a graphic interface (42*c*) for specifying a list of commands (CMD) or a graphic interface (42*d*) for specifying said sequence of commands (CPRG) via a flowchart, wherein each of the plurality of commands (CMD) comprises data that identify an action (AT) and one or more parameters (ARG) for said action (AT), and wherein the plurality of commands comprises a first movement command configured for movement of said robotic arm (10) into a given point of interest (CPOI1) of said one or more points of interest (CPOI) by specifying as one of said one or more parameters the respective identifier of said given point of interest (CPOI1);

b) during a following second online phase:

acquiring (2202) via said one or more sensors (102, 12) at least one of one or more images (IMG) or a point cloud (PC) of said component (20), and comparing said at least one of one or more images (IMG) or said point cloud (PC) with said three-dimensional model (CM) of said component (20) to determine a position of said component (20) with respect to said robotic arm (10);

converting (2206) coordinates of said given point of interest (CPOI1) in said given reference system (REF) of said first virtual environment (42*b*) into coordinates in said reference system of the robotic arm (10) using said determined position of said component (20) with respect to said robotic arm (10);

generating (2208) a second virtual environment using said three-dimensional model (CM) of said component (20) and a model (RM) of said robotic arm;

repeating the following steps for each command of said plurality of commands (CMD) of said sequence of commands (CPRG):

determining whether said command (CMD) corresponds to said first movement command configured for movement of said robotic arm (10) into said given point of interest (CPOI1);

in a case where said command (CMD) corresponds to said first movement command configured for movement of said robotic arm into said given point of interest, selecting (2210) a trajectory configured to move said robotic arm (10) in the coordinates of said given point of interest (CPOI1) in said reference system of the robotic arm (10) and evaluating said selected trajectory in said second virtual environment to determine whether said robotic arm (10) can follow said selected trajectory without colliding with said three-dimensional model (CM) of said component (20); and in the case where said robotic arm (10) can follow said selected trajectory without colliding with said three-dimensional model (CM) of said component (20), generating one or more movement instructions (RPRG) for said selected trajectory and sending said one or more movement instructions (RPRG) to said controller (30).

2. The method according to claim 1, further comprising acquiring (2202) via said one or more sensors (102, 12) at least one of one or more images (IMG) or a point cloud (PC) of one or more obstacles in said environment in which said robotic arm (10) is positioned, wherein said generating (2208) the second virtual environment further comprises generating a three-dimensional model of said one or more obstacles as a function of said at least one of said one or more images (IMG) or said point cloud (PC) of said one or more obstacles in said environment in which said robotic arm is positioned and positioning said three-dimensional model of said one or more obstacles in said second virtual environment; and wherein said evaluating said selected trajectory in said second virtual environment further comprises determining whether said robotic arm (10) can follow said selected trajectory without colliding with said three-dimensional model of said one or more obstacles.

3. The method according to claim 2, wherein said selecting (2210) the trajectory configured to move said robotic arm (10) in the coordinates of said given point of interest (CPOI1) in said reference system of the robotic arm (10) further comprises defining an optimization problem by adding as constraints all the models present in said second virtual environment and constraints with reference to the coordinates of said given point of interest (CPOI1), and selecting a trajectory optimized according to a given cost function, including at least one of a distance covered, inertia on the joints, or energy consumption, or a combination thereof.

4. The method according to claim 1, further comprising saving said sequence of commands (CPRG) in a form of a list including at least one of an Excel, CSV, or XML file.

5. The method according to claim 1, wherein said plurality of commands further comprise one or more second movement commands configured for at least one of:

movement in a point determined as a function of a previous command;

a predetermined movement; or opening of a file that comprises a sequence of the one or more movement instructions, and sending of said one or more movement instructions to said controller (30).

6. The method according to claim 1, wherein said plurality of commands comprise one or more commands configured to request acquisition of the data via said one or more sensors (102, 12) including at least one of:

acquisition of an audio recording and storage of the audio recording in a file; or acquisition of an audio recording, generation of a text via a speech recognition of said audio recording, and comparison of the generated text with a reference text; or acquisition of an image and storage of the image in a file; or acquisition of an image, generation of a text via a character-recognition operation on said image, and comparison of the generated text with a reference text.

7. The method according to claim 1, wherein one or more actuators (104) are mounted on said robotic arm (10), and wherein said plurality of commands comprise at least one of:

one or more commands configured to drive said one or more actuators (104); or one or more commands configured to simultaneously drive said one or more actuators (104) and acquire data via said one or more sensors (102, 12).

8. The method according to claim 1, wherein said robotic arm (10) is mounted on a mobile platform (14).

9. The method according to claim 1, wherein said sequence of commands (CPRG) comprises data that specify for each of the plurality of commands (CMD) a respective condition (CON) that indicates when the respective action (AT) should be executed.

10. A system for inspecting and/or handling a component, comprising:

a robotic arm (10) and a controller (30), wherein movement of said robotic arm (10) is managed via said controller (20) as a function of movement instructions, wherein said movement instructions specify one or more points of a trajectory in a reference system of the robotic arm (10);

one or more sensors (102, 12), which are mounted on at least one of said robotic arm (10), or installed on a platform (14) on which said robotic arm (10) is mounted, or are installed in an environment wherein said robotic arm (10) is positioned; and a computer (40*a*), wherein said controller (20) and said one or more sensors (102, 12) are in communication with said computer (40*a*), and said computer (40*a*) is configured for implementing the method according to claim 1.

11. A computer-program product that can be loaded into a memory of at least one computer and comprises portions of software code for implementing the steps of the method according to claim 1.

12. The method according to claim 8, wherein the mobile platform comprises an automated guided vehicle.

13. The method of claim 1, wherein the first movement command is at least one of a first in time movement command of the plurality of commands in the sequence of commands or a first in time command of the plurality of commands in the sequence of commands.

14. The method of claim 6, wherein the one or more commands configured to acquire the data via said one or more sensors comprise at least one of a look command or a listen command.

15. The method of claim 7, wherein the one or more commands configured to drive said one or more actuators comprise at least one of a reproduce command or a touch command; and the one or more commands configured to simultaneously drive said one or more actuators and acquire data via said one or more sensors comprise at least one of a tap command or an ultrasound command.

* * * * *